United States Patent
Fujimoto et al.

(10) Patent No.: US 10,551,543 B2
(45) Date of Patent: Feb. 4, 2020

(54) LIGHT GUIDE DEVICE, ILLUMINATION DEVICE, AND DISPLAY

(71) Applicant: FUJI XEROX CO., LTD., Tokyo (JP)

(72) Inventors: Takashi Fujimoto, Kanagawa (JP); Jiro Minabe, Kanagawa (JP); Yasuhiro Ogasawara, Kanagawa (JP); Shigetoshi Nakamura, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 177 days.

(21) Appl. No.: 15/903,250

(22) Filed: Feb. 23, 2018

(65) Prior Publication Data
US 2018/0267224 A1 Sep. 20, 2018

(30) Foreign Application Priority Data
Mar. 16, 2017 (JP) .................................. 2017-051316

(51) Int. Cl.
*G02B 6/00* (2006.01)
*F21V 8/00* (2006.01)

(52) U.S. Cl.
CPC ........... *G02B 6/003* (2013.01); *G02B 6/0021* (2013.01); *G02B 6/0028* (2013.01); *G02B 6/0031* (2013.01); *G02B 6/0036* (2013.01)

(58) Field of Classification Search
CPC .... G02B 6/003; G02B 6/0021; G02B 6/0028; G02B 6/0031; G02B 6/0036
See application file for complete search history.

(56) References Cited

U.S. PATENT DOCUMENTS

2008/0004510 A1  1/2008  Tanzawa et al.

FOREIGN PATENT DOCUMENTS

| JP | 10-063210 A | 3/1998 |
|----|-------------|--------|
| JP | 2003-084142 A | 3/2003 |
| JP | 2003-084182 A | 3/2003 |
| JP | 2007-279020 A | 10/2007 |
| JP | 2012-243719 A | 12/2012 |
| JP | 2013-164524 A | 8/2013 |
| JP | 2015-230410 A | 12/2015 |

OTHER PUBLICATIONS

Takeda, et.al., "Light Guide Sheet, Illumination Type Key Sheet and Decorative Molded Body", JP2012243719, machine translation. (Year: 2012).*

* cited by examiner

*Primary Examiner* — Wen Huang
(74) *Attorney, Agent, or Firm* — Sughrue Mion, PLLC

(57) ABSTRACT

A light guide device includes a light guide plate that includes a first surface and a second surface facing the first surface in one of which plural light exit portions are provided, that guides light introduced into the light guide plate while reflecting the light between the first surface and the second surface, and that refracts or reflects the guided light so as to cause the light to exit by using the plural light exit portions. The light guide device has an introduction portion that is provided in the light guide plate and that introduces at least part of light incident upon the introduction portion in plural directions in a plane where the light is guided by the light guide plate.

9 Claims, 11 Drawing Sheets

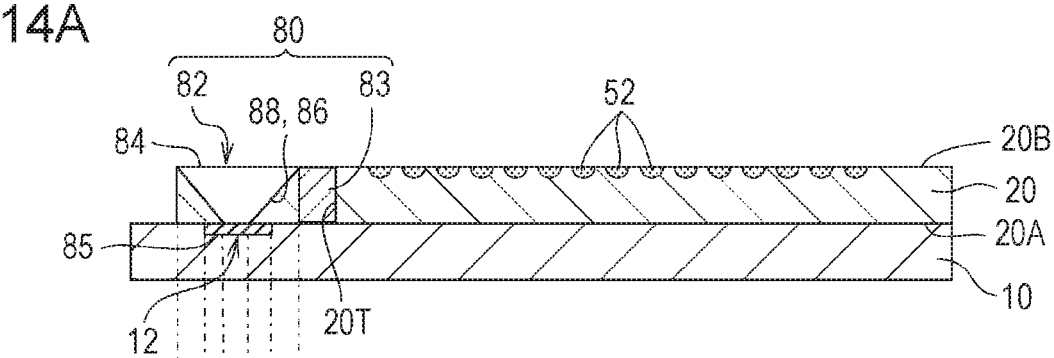
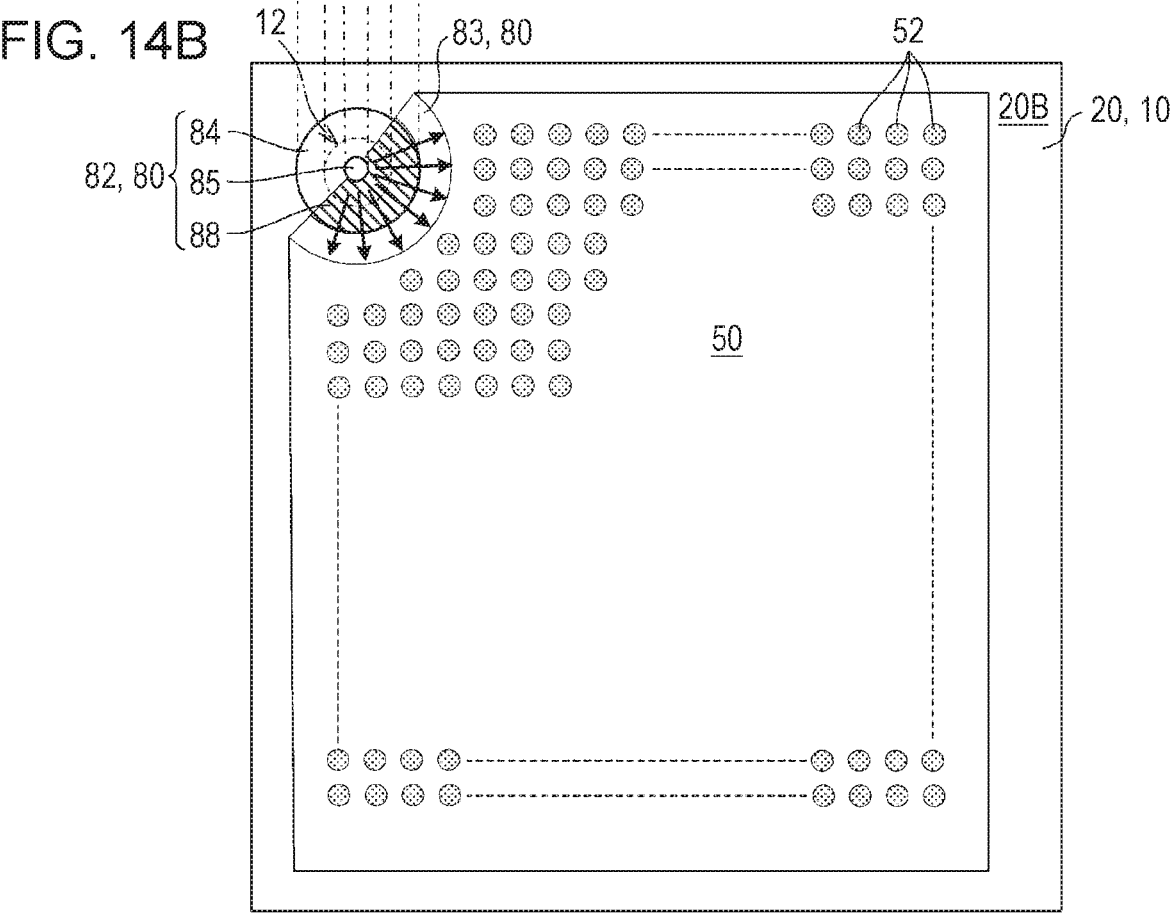

LIGHT GUIDE DEVICE, ILLUMINATION DEVICE, AND DISPLAY

CROSS-REFERENCE TO RELATED APPLICATIONS

This application is based on and claims priority under 35 USC 119 from Japanese Patent Application No. 2017-051316 filed Mar. 16, 2017.

BACKGROUND

Technical Field

The present invention relates to a light guide device, an illumination device, and a display.

SUMMARY

According to an aspect of the present invention, a light guide device includes a light guide plate that includes a first surface and a second surface facing the first surface in one of which plural light exit portions are provided, that guides light introduced into the light guide plate while reflecting the light between the first surface and the second surface, and that refracts or reflects the guided light so as to cause the light to exit by using the plural light exit portions. The light guide device has an introduction portion that is provided in the light guide plate and that introduces at least part of light incident upon the introduction portion in plural directions in a plane where the light is guided by the light guide plate.

BRIEF DESCRIPTION OF THE DRAWINGS

Exemplary embodiments of the present invention will be described in detail based on the following figures, wherein:

FIGS. 14A and 14B are respectively a sectional view and a plan view of an example of a configuration of a display according to a third exemplary embodiment of the present invention;

DETAILED DESCRIPTION

Examples of exemplary embodiments of the present invention will be described in detail below with reference to the drawings.

First Exemplary Embodiment

Overall Configuration of a Display

First, an overall configuration of a display is described.

Figure 1:
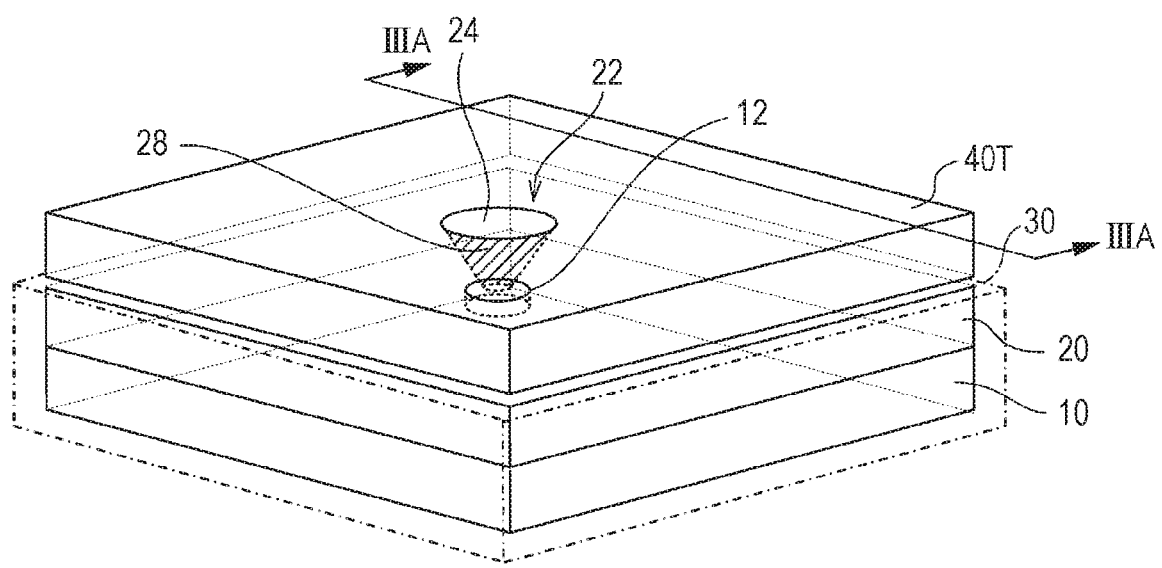
FIG. 1 is a perspective view of an example of a configuration of a display according to a first exemplary embodiment of the present invention.
Figure 2A:
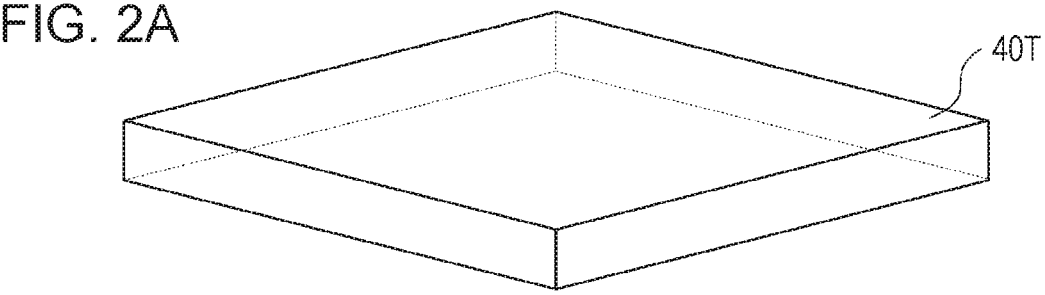
FIGS. 2A to 2D illustrate an exploded perspective view of the example of the configuration of the display according to the first exemplary embodiment of the present invention.
Figure 2B:
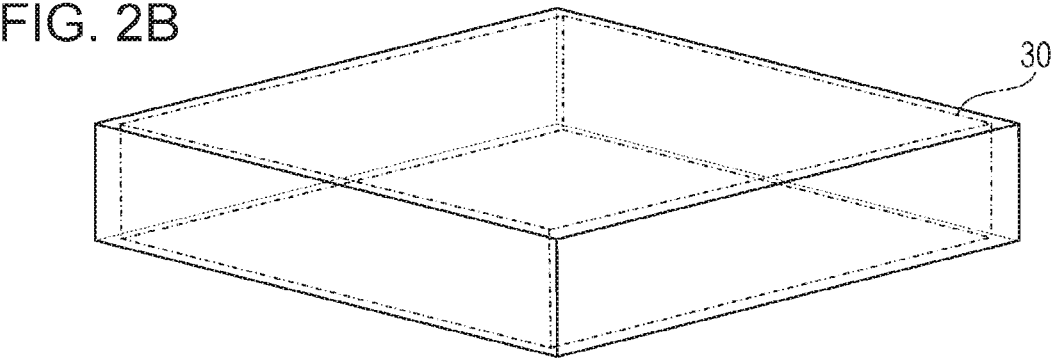
Figure 2C:
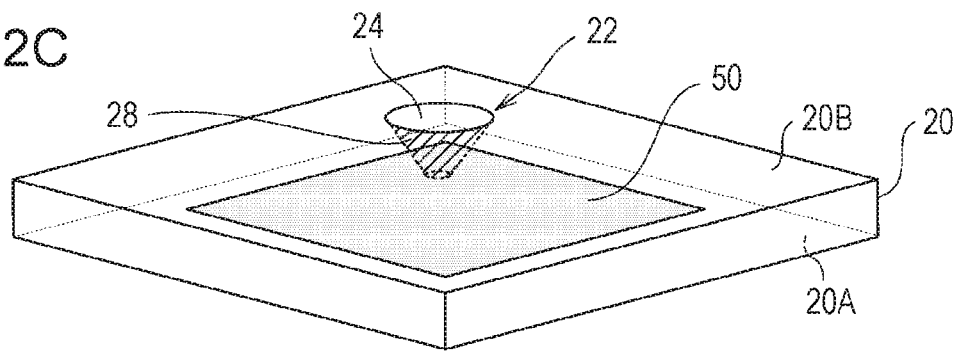
Figure 2D:
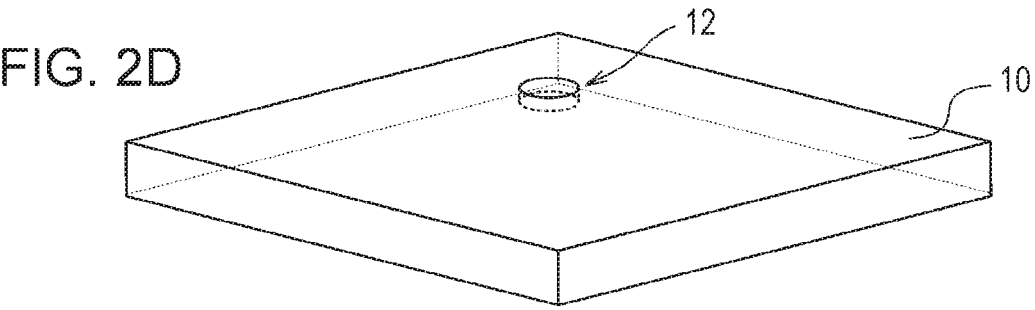
Figure 3A:
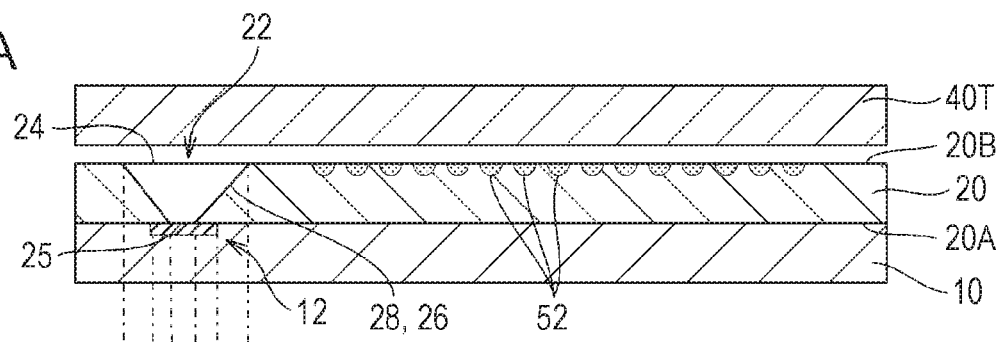
FIG. 3A is a sectional view of the display illustrated in FIG. 1 taken along line IIIA-IIIA.
Figure 3B:
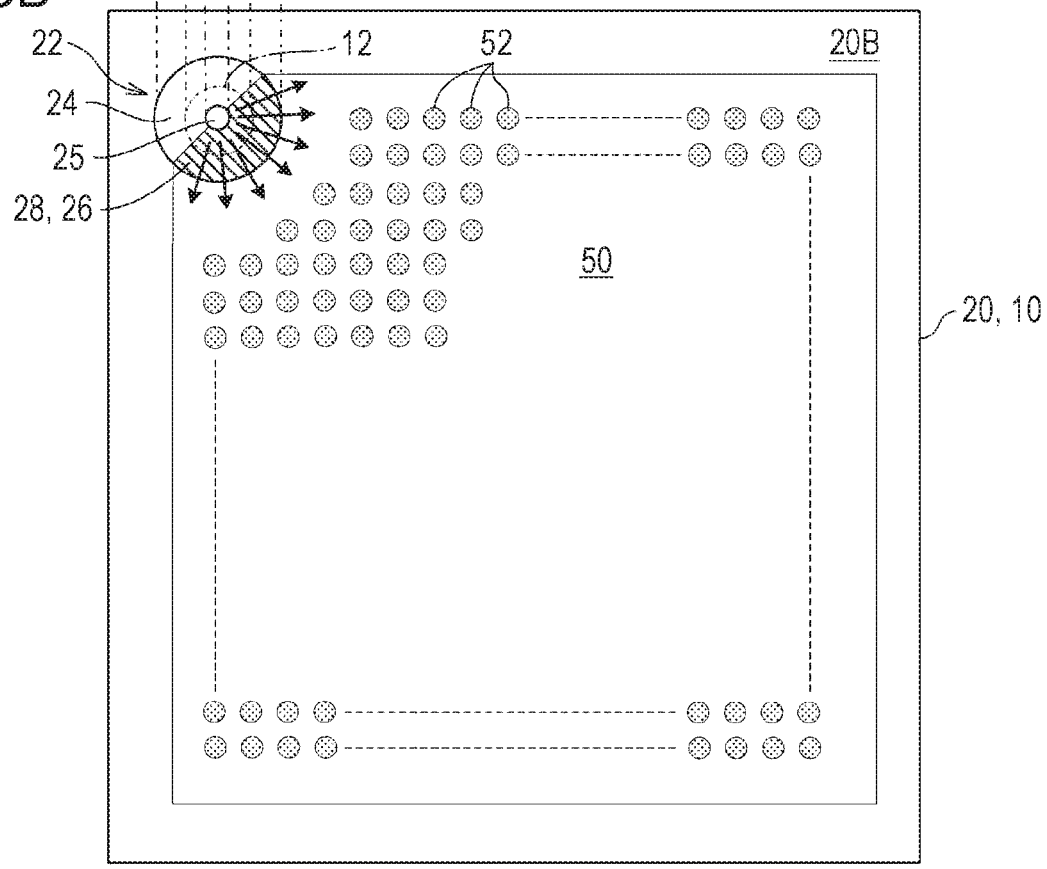
FIG. 3B is a plan view of the display illustrated in FIG. 1 with a hologram recording medium removed.

FIG. 1 is a perspective view of an example of a configuration of the display according to a first exemplary embodiment of the present invention. FIGS. 2A to 2D illustrate an exploded perspective view of the example of the configuration of the display according to the first exemplary embodiment of the present invention. FIG. 3A is a sectional view of the display illustrated in FIG. 1 taken along line IIIA-IIIA. FIG. 3B is a plan view of the display illustrated in FIG. 1 with a hologram recording medium removed.

As illustrated in FIGS. 1 to 3B, the display according to the present exemplary embodiment illuminates a hologram recording medium 40T with a beam of light exiting a light guide plate 20 so as to display a "stereoscopic image" recorded in the hologram recording medium 40T. The display includes an external device 10, the light guide plate 20, and the hologram recording medium 40T. The light guide plate 20 is disposed on a light exit side of the external device 10. The hologram recording medium 40T is disposed on a light exit side of the light guide plate 20.

In the illustrated example, the external device 10 and the light guide plate 20 are held in a housing 30. The hologram recording medium 40T is attached to a surface of the housing 30.

The external device 10 is, for example, a smartphone, a flash light, a street light, an electrical (illuminated) sign, or a signage that includes a light source 12. In the illustrated example, the external device 10 is a plate-shaped smartphone that includes the light source 12 on one of its surfaces.

The light guide plate 20 is a polyhedron such as a flat plate formed of transparent resin or glass. In the illustrated example, the light guide plate 20 has a rectangular parallelepiped shape. Here, the term "transparent" refers to a state in which the light guide plate 20 allows a guided beam to be transmitted through or to be reflected by the light guide plate 20. The light guide plate 20 disperses and guides in an in-plane direction the beam incident thereupon and causes the guided beam to exit through a light exit surface. Here, the term "in-plane direction" refers to a direction within a plane in which the beam is guided by the light guide plate 20 and a direction extending along the light exit surface.

The hologram recording medium 40T is a sheet-shaped recording medium formed of transparent resin or glass. The term "transparent" here means that the beam for illumination is transmitted or reflected. A transmission hologram of the stereoscopic image is recorded in the hologram recording medium 40T. The stereoscopic image (three-dimensional object image) is recorded as a transmission hologram by using an object beam having image information of the stereoscopic image. Examples of image information of the stereoscopic image include image information of a parallax image which is a stereoscopic image displayed with parallax continued in a viewpoint moving direction.

Here, the term "transmission hologram" refers to a type of hologram recorded by radiating an object beam and a reference beam from the same side toward a recording medium. When an illumination beam is radiated toward a transmission hologram, a stereoscopic image is displayed on the opposite surface side to the radiated surface side radiated with the illumination beam.

The visibility of the stereoscopic image is improved when the illumination beam radiated toward the transmission hologram is a "parallel beam" having the same angle as that of the reference beam used to record the transmission hologram. The illumination beam incident at a different angle from that of the reference beam is transmitted or reflected instead of being diffracted by the transmission hologram and becomes an unnecessary beam other than a reproduction beam. The unnecessary beam decreases the visibility of the stereoscopic image.

The housing 30 has an opening on the external device 10 side and holds the external device 10 and the light guide plate 20 therein. The housing 30 is a casing formed of transparent resin or glass. The term "transparent" here means that the incident beam is transmitted or reflected. Side surfaces of the external device 10 and side surfaces and a front surface of the light guide plate 20 are covered by the housing 30. A rear surface of the housing 30 faces the external device 10 and the light guide plate 20.

The housing 30 may be omitted. When the housing 30 is omitted, the hologram recording medium 40T is attached to the light guide plate 20. Alternatively, the housing 30 and the hologram recording medium 40T may be integrated with each other.

The Light Source

A light emitting diode (LED), a xenon lamp, a semiconductor laser, an organic electroluminescent (EL) element, a cold-cathode tube, a fluorescent lamp, or the like is used as the light source 12. The beam emitted from the light source 12 includes a light component having the same wavelength as that of the beam used for recording the "transmission hologram".

The Light Guide Plate

The light guide plate 20 includes a first surface 20A and a second surface 20B facing the first surface 20A. According to the first exemplary embodiment, the second surface 20B is the light exit surface. The light guide plate 20 guides in the in-plane direction a beam of light incident thereupon while reflecting the beam between the first surface 20A and the second surface 20B.

Furthermore, the light guide plate 20 includes an introduction portion 22 and plural light exit portions 52. The introduction portion 22 is provided in the light guide plate 20. The plural light exit portions 52 are provided in the second surface 20B of the light guide plate 20. According to the present exemplary embodiment, the light guide plate 20 that includes the introduction portion 22 and the plural light exit portions 52 is an example of a "light guide device".

Figure 4:
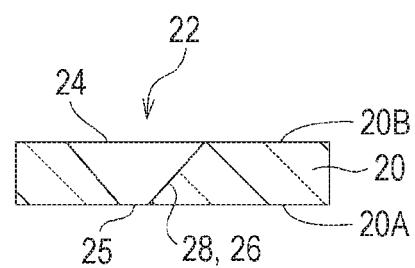
FIG. 4 is a sectional view of an example of a configuration of an introduction portion.

FIG. 4 is a sectional view of an example of a configuration of the introduction portion 22. As illustrated in FIG. 4, the introduction portion 22 is a frusto-conical recess having a bottom surface 24, a bottom surface 25, and a side surface 26. The bottom surface 25 faces the bottom surface 24 and has a smaller area than the area of the bottom surface 24. In the illustrated example, the bottom surface 24 is flush with the second surface 20B and the bottom surface 25 is flush with the first surface 20A. That is, the frusto-conical recess is a through hole opening at the second surface 20B and the first surface 20A.

A reflective surface 28 is provided on at least part of the side surface 26. The reflective surface 28 may perform specular reflection or diffused reflection on the incident beam. The reflective surface 28 that performs specular reflection on the incident beam is formed of a light reflective material such as, for example, a white pigment or metal such as aluminum. The reflective surface 28 that performs diffused reflection on the incident beam is formed by making asperities in the side surface 26, that is, for example, by roughening the side surface 26. The recess may be filled with resin that is transparent for the beam emitted from the light source 12. Alternatively, the recess may have a prismoidal shape, and a reflective surface may be provided on the side surface of the prismoidal shape.

The light guide plate 20 is superposed on the external device 10 such that the introduction portion 22 is disposed above the light source 12. The introduction portion 22 is disposed such that the smaller bottom surface of the frusto-conical shape faces the light source 12. In more detail, the introduction portion 22 is disposed above the light source 12 so that the beam emitted from the light source 12 is radiated to the bottom surface 25 and the side surface 26 of the introduction portion 22. Although the external device 10 and the light guide plate 20 each have a flat plate shape and the light guide plate 20 is superposed on the external device 10 according to the present exemplary embodiment, the external device 10 does not necessarily have a flat plate shape. It is sufficient that light guide plate 20 be disposed relative to the external device 10 so that the beam emitted from the light source 12 is incident upon the light guide plate 20.

The plural light exit portions 52 are disposed throughout a light exit region 50 of the second surface 20B of the light guide plate 20. Each of the plural light exit portions 52 is an optical element such as a microlens or a prism. Each of the plural light exit portions 52 causes part of a corresponding one of rays of the beam incident thereupon to be refracted and to exit through the second surface 20B. The optical elements also include recesses or projections provided in the light exit surface. The recesses or the projections may have a shape such as a conical shape, a pyramid shape, a cylindrical shape, a prismatic shape, a triangular wave shape, or a hemispherical shape. Portions of the second surface 20B where the light exit portions 52 are not provided reflect the beam incident thereupon toward the first surface 20A side.

Figure 13:
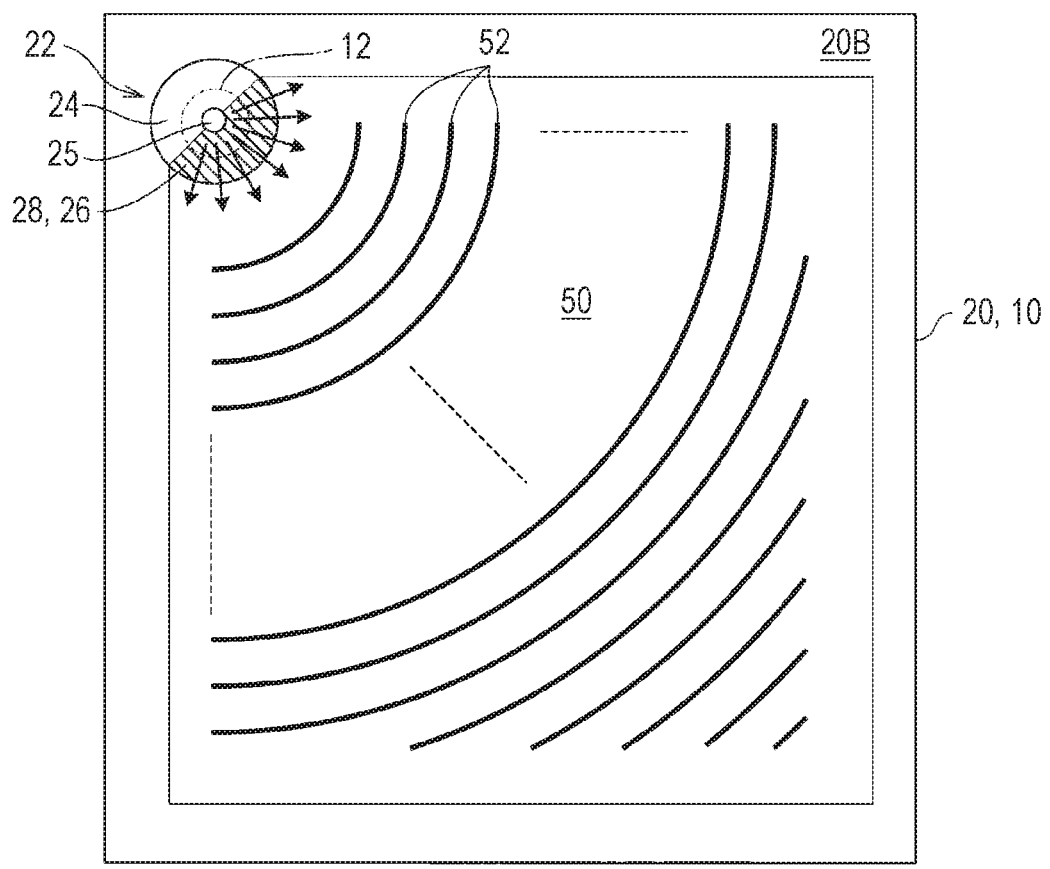
FIG. 13 is a plan view of an example of a configuration of light exit portions according to a variation.

The plural light exit portions 52 may be arranged in a matrix shape as illustrated in FIG. 3B or randomly arranged. Alternatively, as illustrated in FIG. 13, plural projections (projections having a linear shape in plan view) may be continuously one-dimensionally arranged. The linear projections are, for example, arranged in a wave front shape, being spaced from one another by a predetermined distance. The beam guided through the light guide plate 20 is attenuated as the distance by which the beam is guided increases. Accordingly, in order to obtain a predetermined amount of light emission by the entirety of the light exit region 50, the number of light exit portions 52 per unit area may be increased toward a portion of the light exit region 50 farthest from the light source 12.

Operation of the Display

Next, operation of the display is described.

Figure 5:
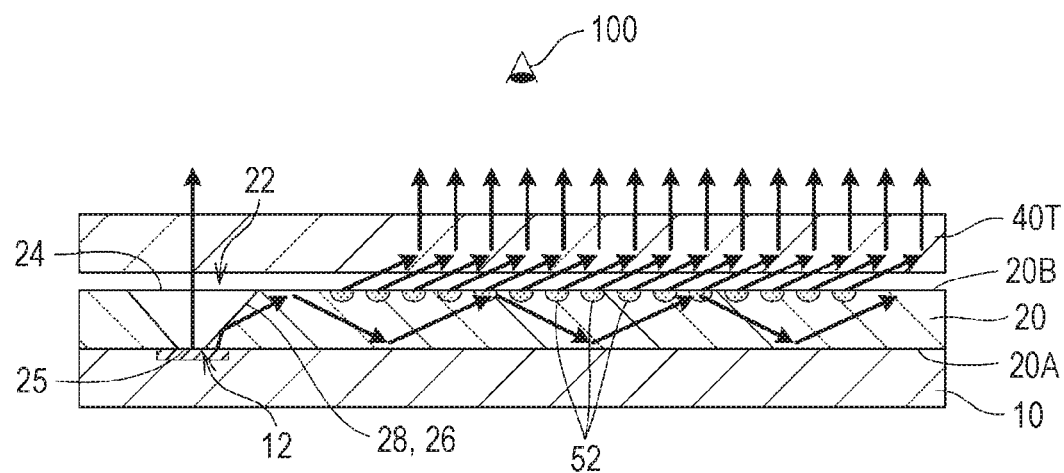
FIG. 5 is a sectional view illustrating an example of operation of the display according to the first exemplary embodiment.

FIG. 5 is a sectional view illustrating an example of operation of the display according to the first exemplary embodiment. As illustrated in FIG. 5, the beam emitted from the light source 12 is incident upon the light guide plate 20 at the first surface 20A. Part of the beam incident upon the light guide plate 20 at the bottom surface 25 is transmitted through the introduction portion 22 and radiated to the hologram recording medium 40T. The hologram recording medium 40T transmits the beam radiated thereto.

For example, when the external device 10 is a smartphone, the light source 12 is turned on by using, for example, an illumination function. Part of the beam emitted from the light source 12 of the smartphone is transmitted through the introduction portion 22 so as to exit. The illumination function of the smartphone as the external device 10 is not damaged and utilized.

Furthermore, a remaining part of the beam incident upon the light guide plate 20 is introduced in plural directions in the plane by the introduction portion 22. The reflective surface 28 is provided on at least part of the side surface 26. The reflective surface 28 is a curved surface having the shape following part or the entirety of the side surface 26 of the frusto-conical shape. As illustrated in FIG. 3B, the remaining part of the beam incident upon the light guide plate 20 is reflected by the reflective surface 28 so as to be introduced in the plural directions in the plane.

For example, the reflective surface 28 is inclined at about 45° relative to the optical axis of the beam to be incident thereupon. The optical axis of the beam incident upon the light guide plate 20 is bent by about 90° by the reflective surface 28. Furthermore, in the illustrated example, the reflective surface 28 is provided in a half of the side surface 26 of the frusto-conical recess. The remaining part of the beam incident upon the light guide plate 20 is reflected so as to be diffused in an angular range of about 90° to 180° in the plane. In the case where the recess has a pyramid shape or a prismoidal shape, the reflective surface includes multiple surfaces having a shape following part or the entirety of the side surface of the pyramid or the prismoid.

The reflective surface 28 is provided on at least part of the side surface 26 in accordance with the position where the introduction portion 22 is disposed. For example, when the introduction portion 22 is disposed near the center of the light guide plate 20, the reflective surface 28 may be provided in the entirety of the side surface 26. In this case, the reflective surface 28 is a curved surface having the shape following the entirety of the side surface of the frusto-conical shape. Thus, the remaining part of the beam incident upon the light guide plate 20 is reflected so as to be diffused in all directions (in an angular range of about) 360° in the plane.

The beam guided through the light guide plate 20 exits through the plural light exit portions 52. A traveling direction of the beam guided through the light guide plate 20 is a direction parallel to the beam guided through the light guide plate 20 (in-plane direction of the second surface 20B). The light exit portions 52 bend the traveling direction of the beam toward the direction of a light exit angle so as to cause the beam to exit. Here, the term "light exit angle" refers to an angle formed between the optical axis of the exit beam and the normal to the second surface 20B. The light exit angle is a particular angle in a range from 0 to 90°. The light amount of a ray of the beam exiting through each of the plural light exit portions 52 is largest in the direction of the light exit angle. The exit beam exiting the light guide plate 20 through the second surface 20B is radiated toward the hologram recording medium 40T as the "illumination beam". The illumination beam is back light that illuminates the hologram recording medium 40T from the back side (the opposite side to an observer 100).

When the illumination beam is radiated toward the hologram recording medium 40T, the illumination beam is diffracted by the transmission hologram, thereby a "reproduction beam" exits through a different surface from a surface toward which the illumination beam is radiated. That is, the reproduction beam exits toward the observer 100 side. This causes the stereoscopic image recorded in the hologram recording medium 40T to be displayed for the observer 100. According to the present exemplary embodiment, rays of the illumination beam exit angles of which are aligned may be generated without use of a complex optical system. Accordingly, a compact display may be provided.

An Illumination Device/An External Unit

Although the "display" includes the external device 10 including the light source 12, the light guide plate 20, and the hologram recording medium 40T according to the above-described exemplary embodiment, the light guide plate 20 may be used alone or in combination with another member as an "illumination device" or an "external unit". The illumination device includes the external device 10 and the light guide plate 20. The hologram recording medium 40T is attachable to/detachable from the illumination device. The external unit includes the light guide plate 20 and the hologram recording medium 40T. The external device 10 is attachable to/detachable from the external unit.

For example, when the external device 10 is a smartphone, the light guide plate 20 may be attached to the smartphone. Alternatively, the smartphone may be combined with the light guide plate 20 so as to be used as the "illumination device". Alternatively, the light guide plate 20, the hologram recording medium 40T, and the housing 30 may be combined with one another so as to be used as a "smartphone casing (external unit)".

First Variation of the Introduction Portion

Next, a first variation of the introduction portion is described.

Figure 6:
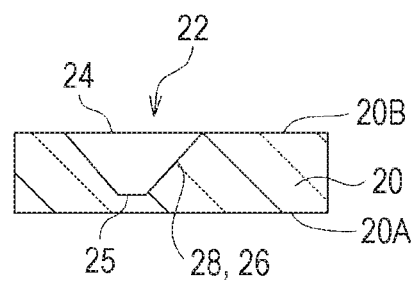
FIG. 6 is a sectional view of an example of a configuration of an introduction portion according to a first variation.

FIG. 6 is a sectional view of an example of a configuration of the introduction portion according to the first variation. Although the frusto-conical recess that defines the introduction portion 22 is a through hole in the example illustrated in FIG. 4, the frusto-conical recess may be closed at the bottom. As illustrated in FIG. 6, the bottom surface 24 of the recess is flush with the second surface 20B. However, the bottom surface 25 of the recess is disposed further to the inside than the first surface 20A. Also in this case, part of the beam incident upon the light guide plate 20 at the bottom surface 25 is transmitted through the introduction portion 22 and radiated to the hologram recording medium 40T.

Second Variation of the Introduction Portion

Next, a second variation of the introduction portion is described.

Figure 7:
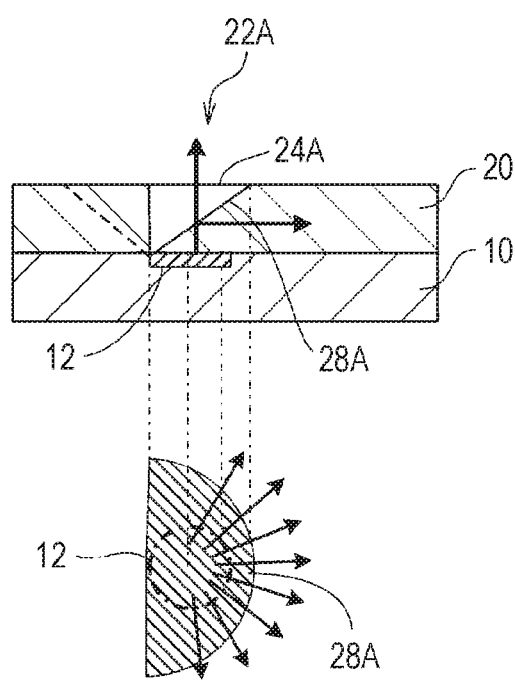
FIG. 7 is a sectional view of another example of a configuration of an introduction portion according to a second variation.

FIG. 7 is a sectional view of another example of a configuration of the introduction portion according to the second variation. Although part of the beam is incident upon the light guide plate 20 through the bottom surface 25 having no reflective surface 28 in the example illustrated in FIG. 4, part of the beam incident upon the light guide plate 20 may be transmitted through a half mirror 28A.

As illustrated in FIG. 7, an introduction portion 22A is a conical recess having a bottom surface 24A and a side surface 26A. In an illustrated example, the bottom surface 24A is flush with the second surface 20B. That is, the conical recess is a hole opening at the second surface 20B and closed at the bottom. The half mirror 28A is provided on at least part of the side surface 26A. The half mirror 28A is a curved surface having the shape following part or the entirety of the side surface of the conical shape. Alternatively, the recess may have a pyramid shape, and a half mirror may be provided on the side surface of the pyramid shape. In this case, the half mirror includes multiple surfaces having a shape following part or the entirety of the side surface of the pyramid or the prismoid.

The light guide plate 20 is superposed on the external device 10 such that the introduction portion 22A is disposed above the light source 12. The introduction portion 22A is disposed such that the apex of the conical shape faces the light source 12. In more detail, the introduction portion 22A is disposed above the light source 12 so that the beam emitted from the light source 12 is radiated to the side surface 26A of the introduction portion 22A. Part of the beam incident upon the light guide plate 20 is transmitted through the half mirror 28A of the introduction portion 22A and radiated to the hologram recording medium 40T. Furthermore, a remaining part of the beam incident upon the light guide plate 20 is reflected by the half mirror 28A of the introduction portion 22A so as to be introduced in plural directions in the plane.

Third Variation of the Introduction Portion

Next, a third variation of the introduction portion is described.

Figure 8:
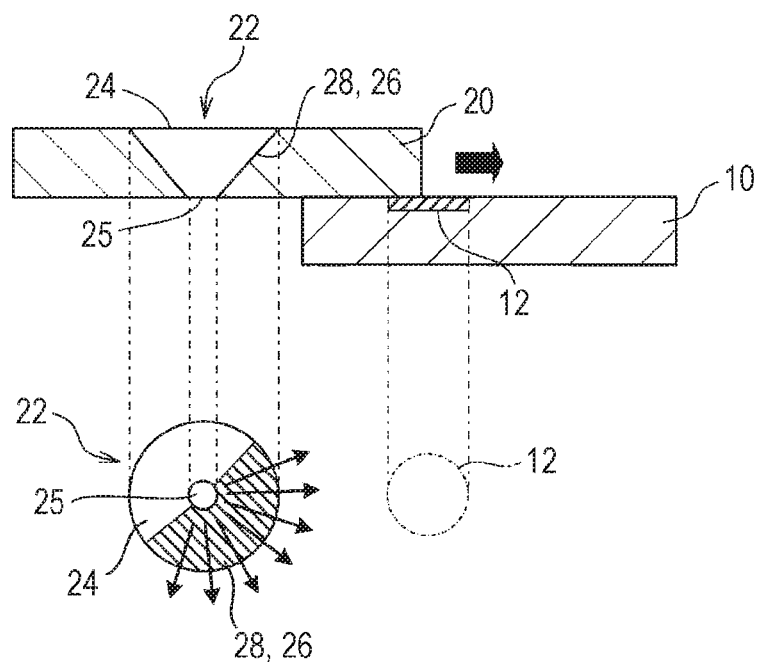
FIG. 8 is a sectional view of another example of a configuration of an introduction portion according to a third variation.

FIG. 8 is a sectional view of another example of a configuration of the introduction portion according to the third variation. Although the positional relationship between the light source 12 and the introduction portion 22 is fixed in the example illustrated in FIG. 4, the introduction portion 22 may be movable relative to the light source 12. As illustrated in FIG. 8, the light guide plate 20 is moved on the external device 10 such that the introduction portion 22 is disposed above the light source 12.

Before the light guide plate 20 is moved, the introduction portion 22 is not disposed above the light source 12. The introduction portion 22 is disposed above the light source 12 by sliding the light guide plate 20 in an arrow direction. As is the case with the example illustrated in FIG. 4, the introduction portion 22 is disposed above the light source 12 so that the beam emitted from the light source 12 is radiated to the bottom surface 25 and the side surface 26 of the introduction portion 22.

Fourth Variation of the Introduction Portion

Next, a fourth variation of the introduction portion is described.

Figure 9:
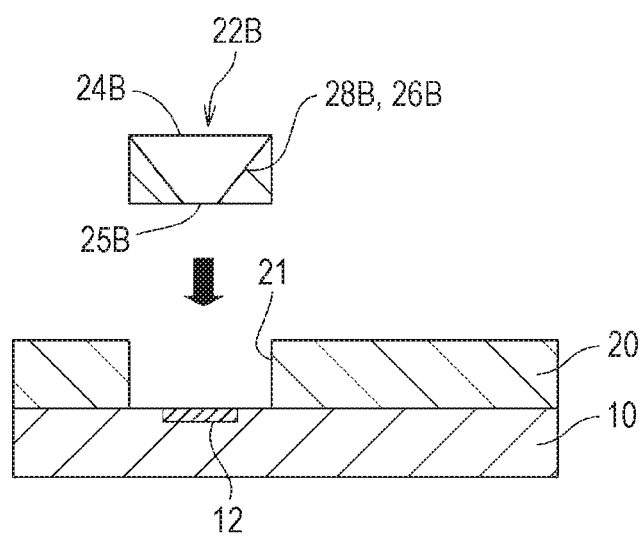
FIG. 9 is a sectional view of another example of a configuration of an introduction portion according to a fourth variation.

FIG. 9 is a sectional view of another example of a configuration of the introduction portion according to the fourth variation. Although the positional relationship between the light source 12 and the introduction portion 22 is fixed in the example illustrated in FIG. 4, an introduction portion 22B may be attachable to/detachable from the light source 12. As illustrated in FIG. 9, the introduction portion 22B is attached to the light guide plate 20 such that the introduction portion 22B is disposed above the light source 12.

The introduction portion 22B is a block having a frusto-conical recess having a bottom surface 24B, a bottom surface 25B, and a side surface 26B. A reflective surface 28B is provided on at least part of the side surface 26B. A recess 21 into which the block is fitted is provided in a region of the light guide plate 20 facing the light source 12. The introduction portion 22B is disposed above the light source 12 by attaching the introduction portion 22B in the recess 21. As is the case with the example illustrated in FIG. 4, the introduction portion 22B is disposed above the light source 12 so that the beam emitted from the light source 12 is radiated to the bottom surface 25B and the side surface 26B of the introduction portion 22B.

Fifth Variation of the Introduction Portion

Next, a fifth variation of the introduction portion is described.

Figure 10:
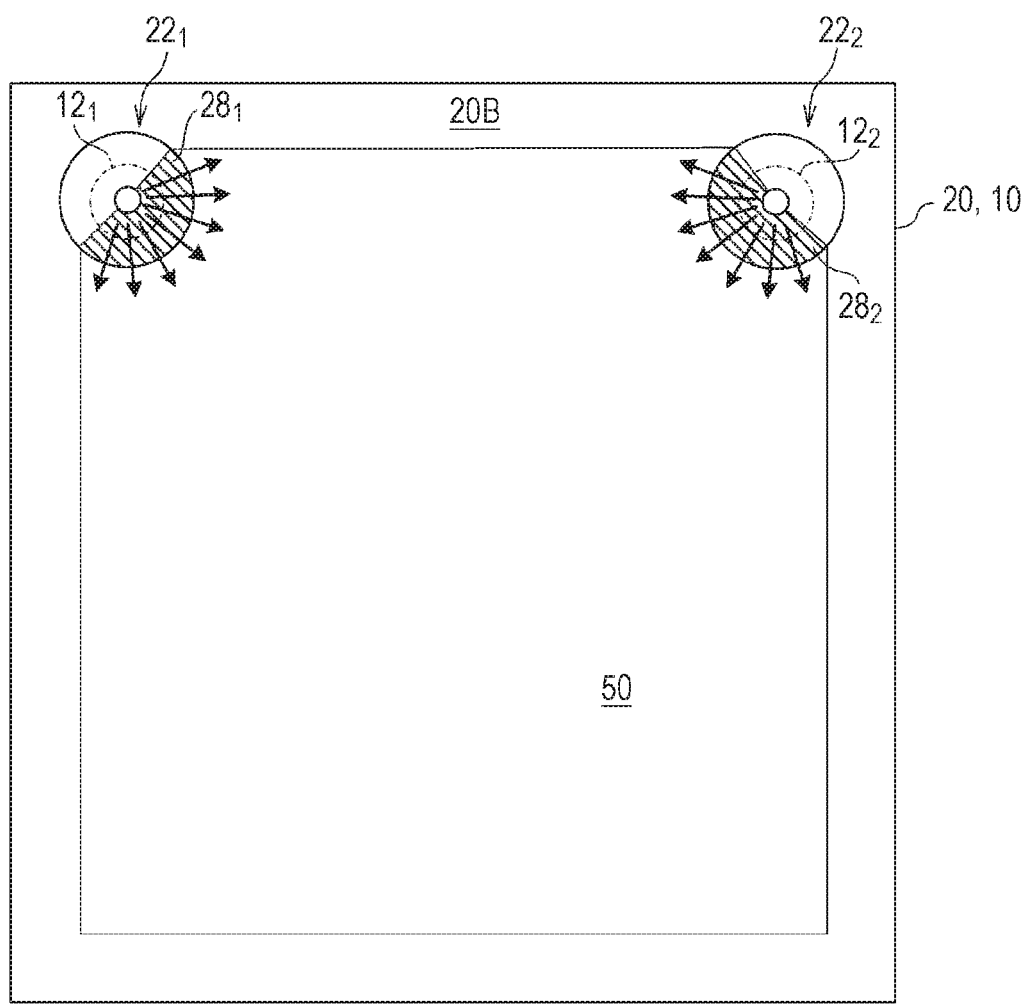
FIG. 10 is a plan view of another example of a configuration of an introduction portion according to a fifth variation.

FIG. 10 is a plan view of another example of a configuration of the introduction portion according to the fifth variation. Although a single introduction portion 22 is provided in the light guide plate 20 in the example illustrated in FIG. 4, plural introduction portions 22 may be provided in accordance with the number of light sources 12. As illustrated in FIG. 10, when the external device 10 includes two light sources 12 (a light source $12_1$ and a light source $12_2$), two introduction portions 22 (an introduction portion $22_1$ and an introduction portion $22_2$) are provided in the light guide plate 20. The plural introduction portions 22 guide respective beams of light.

The introduction portion $22_1$ reflects the beam incident thereupon from the corresponding light source $12_1$ using a corresponding reflective surface $28_1$ so as to introduce the beam in plural directions in the plane. The introduction portion $22_2$ reflects the beam incident thereupon from the corresponding light source $12_2$ using a corresponding reflective surface $28_2$ so as to introduce the beam in plural directions in the plane.

Second Exemplary Embodiment

Figure 11:
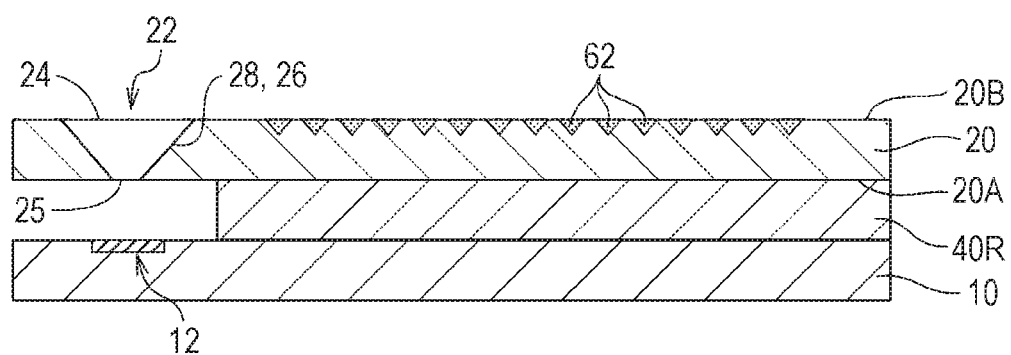
FIG. 11 is a sectional view of an example of a configuration of a display according to a second exemplary embodiment of the present invention.

A reflection hologram instead of the transmission hologram is used for a second exemplary embodiment. FIG. 11 is a sectional view of an example of a configuration of a display according to the second exemplary embodiment of the present invention. Other than use of the reflection hologram, the configuration of the display according to the second exemplary embodiment is the same as that of the display according to the first exemplary embodiment illustrated in FIGS. 1 to 4. Thus, like elements are denoted by like reference signs and description thereof is omitted.

A hologram recording medium 40R is a sheet-shaped recording medium formed of transparent resin or glass. The term "transparent" here means that the beam for illumination is transmitted or reflected. A reflection hologram of a stereoscopic image is recorded in the hologram recording medium 40R. Here, the term "reflection hologram" refers to a type of hologram recorded by radiating an object beam and a reference beam from one surface side and the opposite surface side toward a recording medium, respectively. When an illumination beam is radiated toward a reflection hologram, a stereoscopic image is displayed on a radiated surface side radiated with the illumination beam.

The display according to the present exemplary embodiment illuminates the hologram recording medium 40R with a beam of light exiting the light guide plate 20 so as to display a "stereoscopic image" recorded in the hologram recording medium 40R. In this regard, the display according to the present exemplary embodiment is similar to that of the first exemplary embodiment. However, the arrangement relationships between the elements are changed in accordance with reproduction operation of the "reflection hologram".

The display according to the present exemplary embodiment includes the external device 10, the hologram recording medium 40R, and the light guide plate 20. The hologram recording medium 40R is disposed on the light exit side of the external device 10. The light guide plate 20 is disposed on the light exit side of the hologram recording medium 40R. According to the present exemplary embodiment, the first surface 20A of the light guide plate 20 is the light exit surface. In other words, the hologram recording medium 40R is disposed on the light exit side of the light guide plate 20.

Furthermore, the light guide plate 20 includes the introduction portion 22 and plural light exit portions 62. The introduction portion 22 is provided in the light guide plate 20. The plural light exit portions 62 are provided in the second surface 20B of the light guide plate 20. The light guide plate 20 is superposed on the external device 10 such that the introduction portion 22 is disposed above the light source 12.

The plural light exit portions 62 are disposed throughout a region of the second surface 20B facing the light exit region of the first surface 20A. Each of the plural light exit portions 62 is a reflective optical element. Each of the plural light exit portions 62 causes part of a corresponding one of rays of a beam incident thereupon to be reflected in a predetermined direction and to exit through the first surface 20A. Here, the "predetermined direction" refers to such a direction that, when the beam reflected by the reflective optical elements is incident upon the first surface 20A in the "predetermined direction", the beam exits without being reflected. The reflective optical elements also include recesses or projections provided in the light exit surface. The recesses or the projections may have a shape such as a conical shape, a pyramid shape, a cylindrical shape, a prismatic shape, a triangular wave shape, or a hemispherical shape.

Portions of the second surface 20B where the light exit portions 62 are not provided reflect the beam incident thereupon toward the first surface 20A side. That is, the beam reflected by the second surface 20B is guided through the light guide plate 20 by being reflected by the first surface 20A. The plural light exit portions 62 may be, as is the case with the plural light exit portions 52 illustrated in FIG. 3B, arranged in a matrix shape or randomly arranged. Alternatively, as illustrated in FIG. 13, plural projections (projections having a linear shape in plan view) may be continuously one-dimensionally arranged in a wave front shape.

Next, operation of the display is described.

Figure 12:
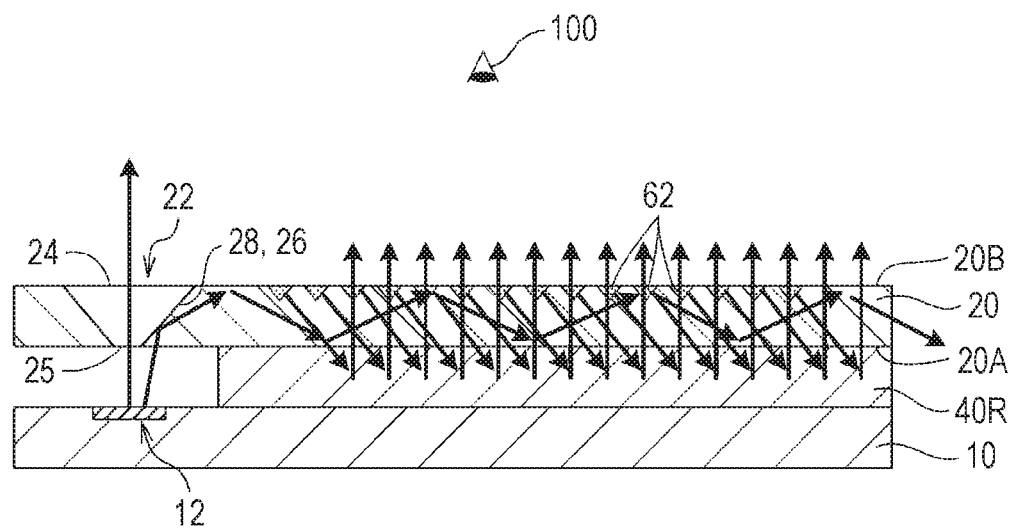
FIG. 12 is a sectional view illustrating an example of operation of the display according to the second exemplary embodiment.

FIG. 12 is a sectional view of an example of operation of the display according to the second exemplary embodiment. As illustrated in FIG. 12, the beam emitted from the light source 12 is incident upon the light guide plate 20 at the first surface 20A. Part of the beam incident upon the light guide plate 20 at the bottom surface 25 is transmitted through the introduction portion 22 and exits the light guide plate 20.

Furthermore, a remaining part of the beam incident upon the light guide plate 20 is introduced in plural directions in the plane by the introduction portion 22. The reflective surface 28 is provided on at least part of the side surface 26. The reflective surface 28 is a curved surface having the shape following part or the entirety of the side surface 26 of the frusto-conical shape. The remaining part of the beam incident upon the light guide plate 20 is reflected so as to be diffused in a predetermined angular range in the plane by the reflective surface 28.

The beam guided through the light guide plate 20 is reflected by the plural light exit portions 62 and exits through the first surface 20A. The light amount of the exit beam exiting through the first surface 20A is largest in the direction of the light exit angle. The exit beam exiting the light guide plate 20 through the first surface 20A is radiated toward the hologram recording medium 40R as the "illumination beam". The illumination beam is front light that illuminates the hologram recording medium 40R from the front side (the same side as the observer 100).

When the illumination beam is radiated toward the hologram recording medium 40R, the illumination beam is diffracted by the reflection hologram, thereby a "reproduction beam" exits through the surface toward which the illumination beam is radiated. That is, the reproduction beam exits toward the observer 100 side. This causes the stereoscopic image recorded in the hologram recording medium 40R to be displayed for the observer 100. According to the present exemplary embodiment, rays of the illumination beam exit angles of which are aligned may be generated without use of a complex optical system. Accordingly, a compact display may be provided.

Third Exemplary Embodiment

According to a third exemplary embodiment, an introduction optical system that introduces a beam emitted from the light source and incident thereupon to the light guide plate is provided outside the light guide plate. FIGS. 14A and 14B are respectively a sectional view and a plan view of an example of a configuration of a display according to the third exemplary embodiment of the present invention. Other than providing of the introduction optical system outside the light guide plate, the configuration of the display according to the third exemplary embodiment is the same as that of the display according to the first exemplary embodiment illustrated in FIGS. 1 to 4. Thus, like elements are denoted by like reference signs and description thereof is omitted. According to the third exemplary embodiment, a hologram recording medium in which a "transmission hologram" is recorded is used.

The display according to the present exemplary embodiment is provided with an introduction optical system 80 disposed outside the light guide plate 20. The introduction optical system 80 includes a reflective portion 82 and a light guide portion 83. The light guide portion 83 is a waveguide such as an optical fiber. The reflective portion 82 corresponds to the introduction portion 22 of the first exemplary embodiment (see FIGS. 3A and 3B). A bottom surface 84, a bottom surface 85, a side surface 86, and a reflective surface 88 respectively correspond to the bottom surface 24, the bottom surface 25, the side surface 26, and the reflective surface 28.

The reflective portion 82 reflects in plural directions at least part of the beam emitted from the light source 12 and incident upon the reflective portion 82. The light guide portion 83 guides the beam reflected by the reflective portion 82 to an end portion 20T of the light guide plate 20. Thus, the introduction optical system 80 introduces in the plural directions in the plane of the light guide plate 20 the at least part of the beam emitted from the light source 12 and incident thereupon.

Although the light source 12 and the light guide plate 20 are disposed close to each other in the illustrated example, the light source 12 and the light guide plate 20 may be kept separated from each other. When the light source 12 and the light guide plate 20 are kept separated from each other, the reflective portion 82 is disposed close to the light source 12. With this configuration, the beam emitted from the light source 12 is caused to be incident upon the light guide plate 20 through the introduction optical system 80.

The Configuration of the Light Guide Plate and a Method of Fabricating the Light Guide Plate Next, an example of the configuration of the light guide plate 20 and an example of a method of fabricating the light guide plate 20 are described.

See, for example, FIGS. 3A, 3B, 7, 11, 14A, and 14B for the configuration of the light guide plate 20. The thickness of the body of the light guide plate 20 is preferably from 0.03 to 3 mm. When the thickness is smaller than 0.03 mm, the size of an optical path is small, and accordingly, the amount of light is small. When the thickness is larger than 3 mm, space saving is difficult. The thickness (height) of the light exit portions 52 or 62 of the light guide plate 20 may be in a range from 5 to 30 μm.

The light guide plate 20 is fabricated by, for example, deposition or molding with transparent resin as a base material. Examples of the transparent resin include thermoplastic resin and thermocurable resin having high transparency such as, for example, polycarbonate, acrylic resin, urethane resin, and polyethylene terephthalate. Among these, for example, polycarbonate, acrylic resin, or urethane resin, which does not have a wavelength absorption range in the visible light range and which has high transparency, is suited. A variety of additives are added to the transparent resin.

A variety of additives are added to the transparent resin. The light guide portion 83 (see FIGS. 14A and 14B) provided outside the light guide plate 20 is, as is the case with the light guide plate 20, fabricated by, for example, deposition of transparent resin. The refractive index of the body of the light guide plate 20 is larger than that of air (refractive index=1). The refractive index of the material of the light guide plate 20 and the light guide portion 83 is preferably in a range from 1.4 to 1.6.

The light exit portions 52 (see FIG. 3A) and the light exit portions 62 (see FIG. 11) of the light guide plate 20 are regularly arranged asperities having a prism shape or a hemispherical shape and formed on the surface of the light guide plate 20 by, for example, ink-jet printing or the like with, a material usable for printing. The material usable for printing is a mixture of a transparent resin, an ultraviolet (UV) curing agent, an additive, and so forth. The material usable for printing is dropped on the surface of the light guide plate 20 and irradiated with UV after being dropped, thereby causing the material to be firmly fixed to the surface of the light guide plate 20.

Examples of the transparent resin for the light exit portions include, for example, polycarbonate, acrylic resin, urethane resin, vinyl chloride resin, ester resin, and, epoxy resin. Examples of the additive include, for example, titanium oxide. The refractive index of the material of the light exit portions 52 and the light exit portions 62 is preferably in a range from 1.4 to 1.6.

The reflective surface 28 (see FIG. 3A) of the introduction portion 22 of the light guide plate 20 is formed as a film by, for example, vapor deposition of metal such as aluminum to a thickness of 30 nm or larger. The half mirror 28A (see FIG. 7) of the introduction portion 22A is formed as a film by, for example, vapor deposition of metal such as aluminum to a thickness of 10 nm or larger.

Variations

The configurations of the light guide plate, the illumination device, the display, and the external unit having been described in the above-described exemplary embodiments are examples. Of course, the configurations may be changed without departing from the gist of the present invention.

For example, according to the first exemplary embodiment, the light exit portions 52 are provided in the second surface 20B of the light guide plate 20 so as to cause the beam incident upon the light exit portions 52 to be refracted and to exit on the second surface 20B side (see FIG. 5). However, as is the case with the second exemplary embodiment, the guided beam may be reflected and be caused to exit on the second surface 20B side.

Figure 15:
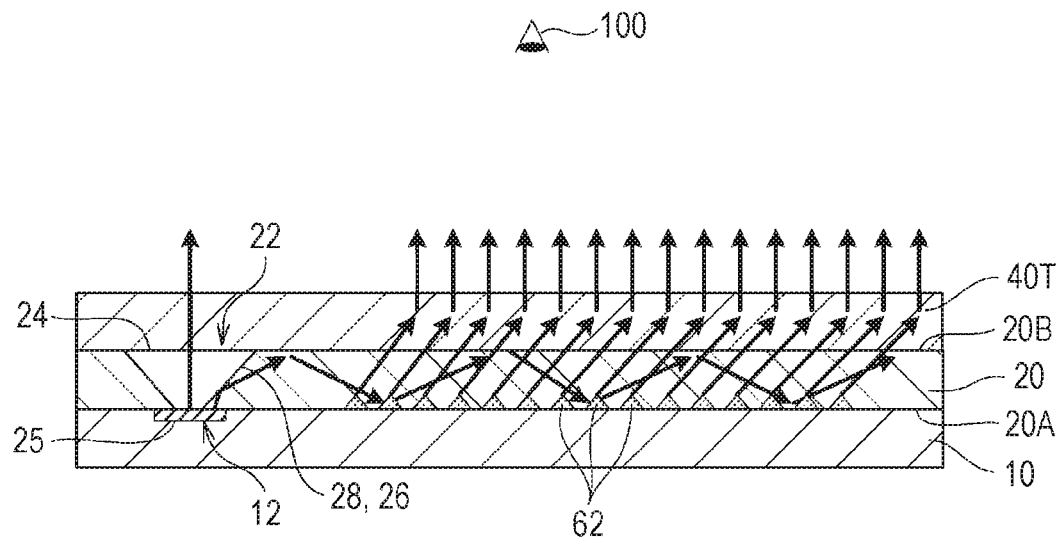
FIG. 15 is a sectional view of an example of a configuration of a display according to a variation.

FIG. 15 is a sectional view of an example of a configuration of the display according to a variation.

The display illustrated in FIG. 15 illuminates with a beam of light exiting the light guide plate 20 the hologram recording medium 40T in which a transmission hologram is recorded so as to display a "stereoscopic image" recorded in the hologram recording medium 40T. The display includes the external device 10, the light guide plate 20, and the hologram recording medium 40T. The light guide plate 20 is disposed on the light exit side of the external device 10. The hologram recording medium 40T is disposed on the light exit side of the light guide plate 20.

The plural light exit portions 62 are disposed throughout a region of the first surface 20A facing the light exit region of the second surface 20B. Each of the plural light exit portions 62 is a reflective optical element. The plural light exit portions 62 reflect in a predetermined direction the guided beam. Thus, the beam exits through the second surface 20B. The exit beam exiting the light guide plate 20 through the second surface 20B is radiated toward the hologram recording medium 40T as the "illumination beam". The illumination beam is back light that illuminates the hologram recording medium 40T from the back side (the opposite side to the observer 100).

Furthermore, for example, according to the second exemplary embodiment, the light exit portions 62 are provided in the second surface 20B of the light guide plate 20 so as to cause the guided beam to be reflected by the light exit portions 62 and to exit on the first surface 20A side (see FIG. 12). However, as is the case with the first exemplary embodiment, the guided beam may be refracted and be caused to exit on the first surface 20A side.

Figure 16:
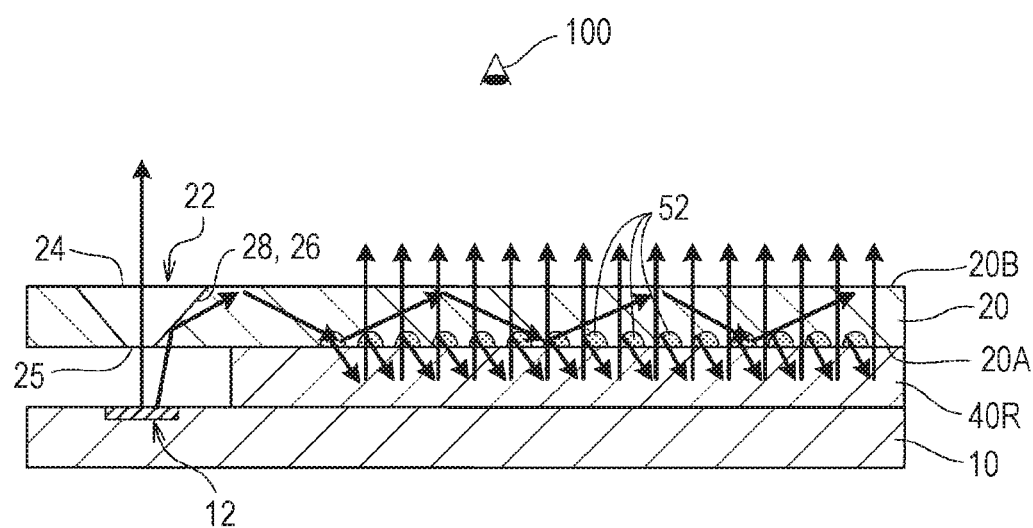
FIG. 16 is a sectional view of another example of a configuration of a display according to a variation.

FIG. 16 is a sectional view of another example of the configuration of the display according to a variation.

The display illustrated in FIG. 16 illuminates with the beam exiting the light guide plate 20 the hologram recording medium 40R in which a reflection hologram is recorded so as to display a "stereoscopic image" recorded in the hologram recording medium 40R. The display includes the external device 10, the hologram recording medium 40R, and, the light guide plate 20. The hologram recording medium 40R is disposed on the light exit side of the light guide plate 20.

The plural light exit portions 52 are disposed throughout the light exit region 50 of the first surface 20A of the light guide plate 20. Each of the plural light exit portions 52 is an optical element such as a microlens or a prism. The plural light exit portions 52 refract the beam incident thereupon so as to cause the beam to exit through the first surface 20A. The exit beam exiting the light guide plate 20 through the first surface 20A is radiated toward the hologram recording medium 40R as the "illumination beam". The illumination beam is front light that illuminates the hologram recording medium 40R from the front side (the same side as the observer 100).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light guide device comprising:
a light guide plate that includes a first surface and a second surface facing the first surface in one of which a plurality of light exit portions are provided, that guides light introduced into the light guide plate while reflecting the light between the first surface and the second surface, and that refracts or reflects the guided light so as to cause the light to exit by using the plurality of light exit portions,
wherein the light guide device has an introduction portion that is provided in the light guide plate and that introduces at least part of light incident upon the introduction portion in a plurality of directions in a plane where the light is guided by the light guide plate, and the introduction portion transmits part of the light incident thereupon and introduces a remaining part of the light.

2. The light guide device according to claim 1,
wherein the introduction portion is defined by a space having a frusto-conical shape or a prismoidal shape having a side surface and bottom surfaces,
wherein the introduction portion is provided with a reflective surface having a shape following part of the side surface or an entirety of the side surface, and
wherein, when the introduction portion is oriented such that a smaller bottom surface out of the bottom surfaces faces a light incident side, part of the light incident upon the introduction portion is transmitted through the introduction portion and a remaining part of the light incident upon the introduction portion is reflected by the reflective surface.

3. The light guide device according to claim 1,
wherein the introduction portion is defined by a space having a conical shape or a pyramid shape having a side surface and an apex,
wherein the introduction portion is provided with a half mirror having a shape following part of the side surface or an entirety of the side surface, and
wherein, when the introduction portion is oriented such that the apex faces a light incident side, part of the light incident upon the introduction portion is transmitted through the half mirror and a remaining part of the light incident upon the introduction portion is reflected by the half mirror.

4. The light guide device according to claim 1,
wherein each of the plurality of light exit portions refracts a corresponding one of rays of the light guided through the light guide plate so as to cause the ray to exit through the one of the first surface and the second surface.

5. The light guide device according to claim 1,
wherein each of the plurality of light exit portions reflects a corresponding one of rays of the light guided through the light guide plate so as to cause the ray to exit through another of the first surface and the second surface which is different from the one of the first surface and the second surface.

6. The light guide device according to claim 1,
wherein each of the plurality of light exit portions causes a corresponding one of rays of the light guided through the light guide plate to exit at a predetermined angle.

7. The light guide device according to claim 1,
wherein the introduction portion is detachable from the light guide plate or movable relative to the light guide plate.

8. An illumination device comprising:
a light source provided in an external device; and
the light guide device according to claim 1.

9. A display comprising:
a light source provided in an external device;
the light guide device according to claim 1; and
a hologram recording medium to be illuminated by the light exiting the light guide device.

* * * * *